United States Patent
Andersen et al.

(10) Patent No.: US 6,379,446 B1
(45) Date of Patent: Apr. 30, 2002

(54) METHODS FOR DISPERSING FIBERS WITHIN AQUEOUS COMPOSITIONS

(75) Inventors: Per Just Andersen; Simon K. Hodson, both of Santa Barbara, CA (US)

(73) Assignee: E. Khashoggi Industries, LLC., Santa Barbara, CA (US)

(*) Notice: Subject to any disclaimer, the term of this patent is extended or adjusted under 35 U.S.C. 154(b) by 0 days.

(21) Appl. No.: 09/541,331

(22) Filed: Apr. 3, 2000

(51) Int. Cl.$^7$ .............................. C08L 97/02; C08L 1/02
(52) U.S. Cl. .............................. 106/162.5; 106/162.51; 106/137.1; 524/13; 524/15
(58) Field of Search ................. 106/162.5, 162.51, 106/137.1; 524/13, 15

(56) References Cited

U.S. PATENT DOCUMENTS

| | | | |
|---|---|---|---|
| 3,850,863 A | 11/1974 | Clendinning et al. | 260/7.5 |
| 3,921,333 A | 11/1975 | Clendinning et al. | 47/37 |
| 4,248,664 A | 2/1981 | Atkinson et al. | 162/145 |
| 4,377,440 A | 3/1983 | Gasland | 162/101 |
| 4,378,271 A | 3/1983 | Hargreaves et al. | 162/145 |
| 4,508,595 A | 4/1985 | Gåsland | 162/158 |
| 4,529,662 A | 7/1985 | Lancaster et al. | 428/450 |
| 4,533,581 A | 8/1985 | Asaumi et al. | 428/64 |
| 4,613,627 A | 9/1986 | Sherman et al. | 521/68 |
| 4,707,221 A | 11/1987 | Beer et al. | 162/158 |
| 4,846,932 A | 7/1989 | Karita et al. | 162/127 |
| 5,106,880 A | 4/1992 | Miller et al. | 521/54 |
| 5,110,525 A | 5/1992 | Kolsky et al. | 264/122 |
| 5,160,368 A | 11/1992 | Begovich | 106/154.1 |
| 5,162,126 A | 11/1992 | Thörner et al. | 426/138 |
| 5,194,206 A | 3/1993 | Koch et al. | 264/115 |
| 5,290,350 A | 3/1994 | Besnard et al. | 106/214 |
| 5,317,037 A | 5/1994 | Golden et al. | 523/128 |
| 5,320,669 A | 6/1994 | Lim et al. | 106/157 |
| 5,346,541 A | 9/1994 | Goldman et al. | 106/163.1 |
| 5,360,586 A | 11/1994 | Wyatt et al. | 264/54 |
| 5,360,828 A | 11/1994 | Morrison | 521/64 |
| 5,362,776 A | 11/1994 | Barenberg et al. | 524/35 |
| 5,372,877 A | 12/1994 | Kannankeril | 428/283 |
| 5,376,320 A | 12/1994 | Tiefenbacher et al. | 264/50 |
| 5,378,418 A | 1/1995 | Berger et al. | 264/83 |
| 5,382,285 A | 1/1995 | Morrison | 106/122 |
| 5,389,322 A | 2/1995 | Kim et al. | 264/112 |
| 5,470,382 A | 11/1995 | Andou | 106/124 |
| 5,500,089 A | 3/1996 | Huang et al. | 162/266 |
| 5,508,072 A | 4/1996 | Andersen et al. | 428/34.5 |
| 5,545,450 A | 8/1996 | Andersen et al. | 428/34.5 |
| 5,576,049 A | 11/1996 | Haas et al. | 427/389.9 |
| 5,580,624 A | 12/1996 | Andersen et al. | 428/34.5 |
| 5,618,341 A | 4/1997 | Andersen et al. | 106/287.35 |
| 5,662,731 A | 9/1997 | Andersen et al. | 106/206.1 |
| 5,663,216 A | 9/1997 | Tomka | 523/128 |
| 5,683,772 A | 11/1997 | Andersen et al. | 160/36.4 |
| 5,705,536 A | 1/1998 | Tomka | 521/84.1 |
| 5,711,908 A | 1/1998 | Tiefenbacher et al. | 264/232 |
| 5,716,440 A | 2/1998 | Andou | 106/124.1 |
| 5,736,209 A | 4/1998 | Andersen et al. | 428/36.4 |
| 5,738,921 A | 4/1998 | Andersen et al. | 428/36.4 |
| 5,749,954 A | 5/1998 | Law et al. | 106/282 |
| 5,849,152 A | 12/1998 | Arnold et al. | 162/116 |
| 5,849,155 A | 12/1998 | Gasland | 162/158 |
| 5,916,503 A | 6/1999 | Rettenbacher | 264/45.3 |

FOREIGN PATENT DOCUMENTS

| | | |
|---|---|---|
| EP | 0 444 880 B1 | 2/1991 |
| EP | 0 524 920 A1 | 7/1992 |
| EP | 0 556 774 A2 | 2/1993 |
| GB | 2 050 459 B | 1/1981 |
| WO | WO 91/12186 | 8/1991 |
| WO | WO 94/18384 | 8/1994 |
| WO | WO 96/30186 | 10/1996 |

*Primary Examiner*—David Brunsman
(74) *Attorney, Agent, or Firm*—Workman, Nydegger & Seeley

(57) ABSTRACT

Compositions and methods in which dry-committed fibers are substantially homogeneously dispersed throughout a fibrous composition. The fibrous composition is characterized as having sufficient yield stress and viscosity such that the shearing forces from the mixing apparatus are effectively transferred down to the fiber level. This is accomplished by means of an appropriate thickening agent, e.g, gelatinized starch. The dry-committed fibers are exemplified by flash dry fibers or fibrous sheets that have been cut or torn into fragments less than 2 cm across. Providing fibers that have been dry-committed greatly reduces the time that it takes to obtain substantially homogeneous dispersion of the fibers throughout the fibrous composition. This, in turn, reduces the risk of mixture spoilage and mechanical or chemical damage to the solid components within the fibrous composition.

24 Claims, No Drawings

METHODS FOR DISPERSING FIBERS WITHIN AQUEOUS COMPOSITIONS

BACKGROUND OF THE INVENTION

1. The Field of the Invention

The present invention relates to short-sequence methods for obtaining aqueous compositions having uniformly dispersed fibers. More particularly, the present invention relates to methods for obtaining aqueous compositions having uniformly dispersed plant-based fibers in a single mixing step.

2. The Relevant Technology

When manufacturing biodegradable articles of manufacture using a biodegradable water-dispersible binder, it has been found desirable to incorporate plant-based fibers therein for reinforcement. Plant-based fibers are themselves biodegradable. Uniformly dispersed fibers, especially longer-length fibers and/or fibers of high aspect ratio, result in articles having substantially the same amount, concentration, and distribution of fibers throughout the entire bonding matrix. Articles so manufactured have greatly increased strength, toughness, and ductility, and such articles attain substantially all of their final strength, flexibility, toughness, and other critical properties immediately or shortly after being demolded without the need for subsequent processing steps or the inclusion of synthetic polymers.

A description of compositions and methods for obtaining substantially homogeneously dispersed fibers within compositions for manufacturing biodegradable articles of manufacture may be found in any one of the following U.S. Pat. Nos. 5,580,624; 5,545,450; 5,662,731; 5,683,772; 5,709,827; 5,679,145; 5,618,341; and 5,848,155. For purposes of disclosing compositions and methods for dispersing fibers within compositions used to manufacture biodegradable articles of manufacture, the foregoing patents are incorporated herein by specific reference.

One method for dispersing fibers employs a pseudo plastic or an approximately Binghamian fluid that is able to impart shear from a mechanical mixing apparatus down to the fiber level to obtain a starch-based composition having substantially uniformly dispersed fibers. This type of fluid is characterized by having an appropriately high viscosity and yield stress, which is typically achieved by blending a viscosity or yield stress increasing agent with water to form a fluid fraction that has the requisite viscosity, yield stress and other desired rheological properties. The viscosity or yield stress increasing agent may comprise a variety of organic thickening agents, an example of which is gelatinized starch. The water is included to form a fluid fraction or aqueous phase in order to gelate the thickening agent and to disperse the fibers in conjunction with the gelatinized thickening agent.

One of the problems encountered when attempting to disperse plant-based fibers has been the form in which such fibers have typically been commercially available. For example, virgin wood fibers are typically sold in large rolls, while recycled paper is typically in the form of newsprint or sheets of paper.

In order to disperse such fibrous rolls or sheets, they are first typically mixed in water under high conditions for 3–10 minutes to yield a water-fiber mixture having the consistency of hamburger. In this condition the fibers are still bound together in large clumps. In order to further separate the fibers and homogeneously disperse them throughout the mixture, a thickening agent such as pregelatinized starch is then added to the water-fiber mixture in order to create the aforementioned Binghamian fluid fraction and the resulting mixture subjected to high shear mixing conditions for an additional 12 minutes. The high viscosity and yield stress of the fluid fraction is able to transfer the shearing action of the mixing apparatus down to the fiber level, thus pulling apart and separating the fibers and also homogeneously mixing them throughout the mixture.

While the foregoing provides an excellent process for separating and dispersing plant-based fibers, it would be an advancement in the art to provide compositions and methods for dispersing plant-based fibers in significantly shorter periods of time.

It would be a further improvement in the art if such compositions and methods for dispersing plant-based fibers in a significantly shorter period of time could also be performed in a single step.

It would yet be an advancement in the art if such compositions and methods for dispersing plant-based fibers imparted less overall shear to the composition, thus reducing the mechanical stresses and potential damage experienced by the fibers and other solid components that may be added to the composition.

Such compositions and methods for dispersing plant-based fibers are disclosed and claimed herein.

SUMMARY AND OBJECTS OF THE INVENTION

The present invention is directed to compositions and methods for obtaining aqueous compositions having substantially uniformly dispersed plant-based fibers. The compositions include water, a thickening agent, and specially treated plant-fibers that are much more easily dispersed than conventional fiber rolls, newsprint, or other sheet-like fibrous materials.

The key to efficiently dispersing plant-based fibers within aqueous compositions in a shorter period of time is to first obtain fibers that are mechanically separated in the first instance, while in a dry state, rather than being bound together in a fiber roll or in a sheet-like form. Fibers in a roll or sheet are mechanically intertwined and held together by web physics. In addition, there may even be some hydrogen bonding between the cellulose molecules comprising the plant-based fibers depending on how the fibers are initially processed. In such a state, a considerable amount of force is necessary just to break down the mechanical and chemical bonds between the fibers even prior to dispersing them throughout the mixture, thus increasing the time and quantity of shear forces that must be applied to achieve homogeneous dispersion of such fibers. Increasing the mixing time and shearing forces applied to the aqueous mixture naturally leads to increased damage to the fibers and any optional solid components within the mixture.

The solution is to at least partially separate the plant-based fibers before they are added to the mixture into which they are to be homogeneously dispersed. This can be done during initial manufacture of plant-based fibers during plant pulping, or else it can be done after formation of rolls or sheets of plant-based fibers but prior to adding the fibers to the aqueous mixture.

Fibers are liberated from plant materials by means of conventionally known pulping processes which utilize highly aqueous slurries. In many cases, such as when pulping trees or other relatively large plant-based raw materials, strong chemicals are required in order to break down the lignins and cellulosic polymers that chemically bind the fibers together and which otherwise prevent the separation of fibers in water. The fibrous slurries resulting from pulping processes are typically dried on a forming wire to yield paper or paperboard sheets, which are rolled up as long sheets or rolls. In some cases, thicker mats may be produced in which the fibers are more loosely bound and which are formed into rolls, typically 3 ft. wide rolls.

More recently, some manufacturers of plant fibers have began producing what are known as "flash-dried" fibers. Instead of laying the fibrous slurry onto a forming wire, as is typically done, the fibrous slurry is partially dried, such as by decantation or vacuum filtration, and then dried within an oven or drying chamber by means of countercurrent hot drying gases. The fibers dried in this manner are not mechanically intertwined and/or chemically bound together as in wet-laid processes, but are loosely bunched together. The dried fibers are compressed into bails for shipment. Such fibers are much more easily dispersed than fibrous rolls or sheets because they are not mechanically intertwined to any appreciable degree.

Alternatively, fibrous rolls or sheets can be mechanically broken down, at least partially, in order to yield a dry fibrous product that is more easily dispersed throughout an aqueous composition. This can be done by simply chopping or tearing the rolls or sheets into smaller fragments, preferably fragments smaller than 2 cm across, more preferably less than 1 cm across, and most preferably less than 5 mm across. The benefit of chopping or tearing the rolls or sheets while in a dry state is that the fragments do not tend to become clumped or agglomerated together by hydrogen bonding, as tends to occur when they are in a moistened state.

When fibers that have been appropriately committed while in a dry state are used, the result is the ability to obtain aqueous mixtures having homogeneously dispersed fibers in a much shorter time frame. This, in turn, reduces the overall amount of shearing forces that must be applied to a given batch of composition, thus better preserving the mechanical and physical integrity of the solid materials within the mixture, including the fibers themselves.

The yield stress and viscosity characteristics of the mixture according to the present invention can be appropriately chosen so that the desired uniform fiber distribution is obtained. This is achieved by incorporating into the mixture an appropriate thickening agent, such as gelatinized starch, in order to provide a fluid fraction having sufficient viscosity and yield stress so as to bring the shear forces of the mixing apparatus down to the fiber level.

The reduced mixing time and process complexity made possible by the features of the present invention lead to a variety of observed advantages with respect to conventional processes. A mixing process that is shorter and involves a reduced number of shear mixing conditions is less complex and potentially requires less capital investment than a process that takes longer and requires a plurality of mixing conditions. Reducing the mixing time also reduces or even eliminates the tendency of certain mixtures to become spoiled, particularly starch-based mixtures which are warmed in order to gelatinize at least a portion of the starch therein. In the case where it is desired to maintain a portion of the starch in an ungelatinized state prior to molding, shorter mixing times and less overall shear help to prevent premature gelatinization of such ungelatinized starch. Lowering the shear necessary to disperse the fibers also helps to reduce damage to the mixing apparatus due to abrasive fillers that may be present in the compositions.

The aqueous compositions containing dispersed fibers may be used to manufacture a wide variety of desired articles, such as by injection molding, die press molding, extrusion molding, vacuum forming, blow molding, jiggering, calendering, and the like.

From the foregoing, it is object of the invention to provide compositions and methods for dispersing plant-based fibers in significantly shorter periods of time.

It is a further object and feature of the invention that such compositions and methods for dispersing plant-based fibers in a significantly shorter period of time can also be performed in a single step.

It is an additional object that such compositions and methods for dispersing plant-based fibers impart less overall shear to the composition, thus reducing the mechanical stresses and potential damage experienced by the fibers and other solid components that may be added to the composition.

These and other objects, features, and advantages of the present invention will become more fully apparent from the following description and appended claims, or may be learned by the practice of the invention as set forth hereinafter.

DETAILED DESCRIPTION OF THE PREFERRED EMBODIMENTS

The present invention is directed to improved methods for obtaining moldable compositions having substantially uniformly dispersed fibers used to make fiber-reinforced articles. Specially processed fibers are uniformly dispersed by means of a high yield stress, high viscosity fluid fraction within the overall composition and are preferably of high aspect ratio (>25:1). To facilitate their dispersion throughout the moldable composition, the fibers are advantageously separated or dry-comminuted prior to addition to the moldable compositions. Articles manufactured from such compositions have greatly increased strength, ductility and toughness. The inclusion of uniformly dispersed fibers allows for the inclusion of significant concentrations of inorganic aggregate fillers.

I. Definitions

The terms "moldable composition", "moldable mixture", "fibrous mixture" and "fibrous composition", as used in the specification and the appended claims, have interchangeable meanings and shall refer to a composition which, at a minimum, includes a fluid fraction comprising water and a thickening agent, such as gelatinized starch, and well dispersed fibers. The composition may also include other admixtures, such as ungelatinized starch granules, inorganic fillers, mold-release agents, organic aggregates, dispersants, cross-linking agents, plasticizers, humectants, enzymes, and the like. If the moldable composition includes starch as the thickening agent, it may be more particularly characterized as a "starch-based composition" or a "starch-based mixture".

The term "fluid fraction", as used in the specification and the appended claims, shall refer to the fluid or gelatinous component within either the moldable or starch-based composition, minus the solid components that are not actually dissolved within the fluid fraction. The fluid fraction includes all components that are dissolved within the aqueous solvent, even materials that are initially solid or which will return to a solid state upon the removal of the aqueous solvent. The fluid fraction is characterized as having a sufficiently high viscosity and yield stress so as to ensure good fiber dispersion during mixing.

The terms "viscosity increasing agent" or "thickening agent", as used in the specification and the appended claims, refers to any generally water soluble or water-dispersible material, such as gelatinized starch or its equivalents, that can be used to increase the viscosity and yield stress of the fluid fraction and thereby aid in the dispersion of the fibers throughout the fluid fraction. The thickening agent works by appropriately increasing the viscosity and yield stress of the fluid fraction to a level in which the shear forces from the mixer can be transferred through the fluid fraction down to the fiber level. Preferred thickening agents, such as gelatinized starch, can also act as a binder upon removing water by evaporation.

As used in the specification and the appended claims, the term "total solids" includes the actual solids dispersed throughout the fluid fraction, together with all admixtures that are initially in a solid or semi-solid state before being dissolved into the fluid fraction. Hence, the term "total solids" includes any portion of, e.g., the starch-based binder or any other admixture that may, at some point, be dissolved into the fluid fraction and which only resolidifies upon the evaporative removal of the water. For purposes of determining the relative concentrations of the components within the starch-based mixture, the term "total solids" will refer to the actual solids within the overall mixture and all solids that are dissolved within the fluid fraction.

The terms "hardening" or "solidifying", as used in the specification and the appended claims, shall refer to the process of removing enough water from the moldable composition to cause it to harden into the shape and structure of a desired article.

The terms "mixing", "combining" and "blending", as used in the specification and the appended claims, shall refer to any process in which two or more components are combined, mixed or blended together to form a mixture.

The term "form-stable", as used in the specification and the appended claims, refers to a newly demolded article that has sufficient strength and structural integrity to be removed from the mold, support its own weight against the force of gravity, and resist significant deformation when exposed to subsequent processing and handling.

The terms "fiber-reinforced article" and "molded article", as used in the specification and the appended claims, are intended to include any article that can be formed using the inventive fiber dispersion processes and compositions. Examples of such articles include containers, such as food and beverage containers, and packaging containers. Molded articles within the scope of this invention also include such disparate objects as cutlery, lightweight cushioning materials, mailing tubes, and toys.

The term "dry-comminuted fibers" refers to fibers which, while in a substantially dry state and prior to blending into the fluid fraction, have been previously processed so as to be substantially separated and non intertwined with each other. An example of such fibers are "flash dried" fibers. Another example are fibrous sheets or rolls which have been chopped or torn apart into smaller fragments (e.g. <2 cm across).

II. Conceptual Overview of the Formation Process

The inventive compositions are prepared by combining selected components and blending them until a homogeneous mixture having uniformly dispersed fibers is obtained. In a first step, dry fibers are provided which are substantially "dry-comminuted", such as flash dried fibers or fibrous sheets or rolls that have been chopped or torn apart into smaller fragments. In a second step, the dry-comminuted fibers are dispersed throughout a composition that, at a minimum, includes a fluid fraction having a sufficiently high yield stress and high viscosity in order to uniformly disperse the fibers within the overall composition. Providing dry-comminuted fibers greatly simplifies the dispersion of fibers throughout the composition by ensuring that most of the shear is going toward actual dispersion rather than being consumed in merely separating the fibers from each other prior to actual dispersion. This, in turn, reduces the duration and/or magnitude of shearing forces that must be employed in order to obtain homogeneous dispersion of the fibers.

In general, uniformly dispersed fibers greatly increase the strength and flexibility of the molded articles. Although fibers having an average fiber length greater than about 2 mm are preferred, it has also been found that shorter-length fibers (i.e., those having an average length between about 0.3 mm to about 2 mm) impart improved strength properties as long as the aspect ratio (>25:1) and concentration (>5% by weight of solids) are kept high, which work together to maintain a high overall fiber length within the mixture.

The moldable compositions are preferably prepared in a single step by combining water, dry-comminuted fibers, a thickening agent, and any optional components and mixing at moderate to high shear for up to about 15 minutes. A preferred thickening agent is starch. Of the various starches available on the market, ungelatinized, unmodified native starch is by far the least expensive. If native starch is used as the thickening agent it must be gelatinized to act as a thickening agent. This is done by mixing the native starch in water heated to above the gelation temperature of the starch, which is typically between about 65° C. to about 95° C.). This can be done either before or after the addition of fibers and other components to the mixture. Of course, other thickening agents can be used instead of, or in addition to, native starch, many of which gelatinize in cold water.

The moldable mixture is mixed at moderate to high shear for an effective amount of time to uniformly disperse the fibers therein, with the increased viscosity and yield stress from the thickening agent transferring the shearing forces from the mixer through the liquid fraction and down to the fiber level. The high yield stress, high viscosity fluid fraction is thus primarily responsible for pulling apart and dispersing the fibers within the fibrous mixture.

Once the fibers have been dispersed to the desired level within the moldable mixture, the mixture may be processed as desired. In some cases, other optional ingredients can be added after dispersing the fibers, although it is generally preferable to add all the ingredients in a single step in order to decrease the overall mixing time before the moldable composition is actually used. This, in turn, decreases potential damage to the solid components and helps to prevent spoilage and undesired changes in rheology to the moldable composition as a result of interactions between the water and the other components over time.

In addition to the water, thickening agent and fibers, other components that may be added to the moldable mixture include unmodified native starch granules that are not gelatinized prior to molding, inorganic fillers, dispersants, humectants, integral coating or sealing materials, cross-linking agents, mold release agents, and the like. If it is intended that any additional unmodified starch is to remain in an ungelatinized state prior to molding, and if the moldable mixture was heated in order to gelatinize an unmodified starch thickener, the moldable mixture should first be cooled to below the gelation temperature of the additional unmodified starch. In some cases, it may be desirable to delay gelatinization of the additional unmodified starch until during the heated molding procedure in order to maintain a moldable composition having a lower viscosity and increased workability and flowability.

The moldable composition can then be used to manufacture a wide variety of molded articles having virtually any desired shape. In many cases such molded articles will have a foamed structural matrix caused by the evaporation of water. Foaming the molded article reduces the density and, hence, the final weight of the molded article.

The viscosity and yield stress of the starch-based composition can be controlled by varying the respective amounts of gelatinized thickener and water within the mixture. Preferably, the yield stress of the fluid fraction used to initially disperse the fibers within the fibrous mixture will be in a range from about 10 Pa to about 5 MPa, preferably in a range from about 20 Pa to about 1 MPa, more preferably from about 50 Pa to about 50 kPa, and most preferably from about 100 Pa to about 10 kPa.

In terms of viscosity, the fluid fraction of the fibrous mixture during fiber dispersion will generally have an apparent viscosity in a range from about 3 Pa·s up to about 500 kpa·s, preferably in a range from about 5 Pa·s to about 50 kpa·s, more preferably from about 10 Pa·s to about 10 kPa·s, and most preferably from about 30 Pa·s to about 1 kPa s (as measured on a Paar-Physica viscometer at a shear rate of 5 $s^{-1}$). The "plastic viscosity" of the same fibrous mixture, when determined by the best fit line on a flow curve at a shear rate between 60 $s^{-1}$ to 100 $s^{-1}$, will fall generally within a broad range from at least about 0.1 Pa·s, up to about 10 kpa·s, preferably in a range from about 0.25 Pa·s to about 1 kPa·s, more preferably from about 0.4 Pa·s to about 500 Pa·s, and most preferably from about 0.5 Pa·s to about 100 Pa·s.

To understand the importance of having a high yield stress fluid fraction within the fibrous mixture, it must be understood that adding solid components to an otherwise Newtonian fluid can often increase both the viscosity and yield stress of the overall mixture. However, it is the fluid fraction that has been found to be the medium by which shear is transferred from the mixing apparatus down to the fiber level. If the fluid fraction has essentially a zero or very low yield stress, even though the overall mixture has a positive yield stress, the fibers will tend to clump or aggregate together while separating or segregating from the noncohesive liquid phase. Only a fluid fraction that has sufficient yield stress and viscosity and, hence, adhesion and cohesion, is able to pull apart and keep the fibers separated during the mixing process.

The fibrous mixture may be mixed at moderate to high shear for up to about 30 minutes, although it is preferably mixed for less than about 15 minutes, more preferably for less than about 10 minutes, and most preferably for less than about 5 minutes, in order to achieve a desired level of fiber dispersion. Of course, the optimum mixing duration depends on the viscosity and yield stress of the fluid fraction and the concentration of fibers therein, with more fibers generally requiring a longer mixing time.

In the case where a high level of solids are included, such as fibers and inorganic fillers, they will tend to increase both the yield stress and viscosity of the final moldable composition beyond the yield stress and viscosity of the fluid fraction.

One of the benefits of using dry-comminuted fibers is the reduction of shear stresses to which the solid components are subjected. In the case of inorganic fillers and fibers, reducing the overall shear stress reduces damage to such solid components. Prolonged shear conditions may also tend to cause premature gelation of starch granule where it is otherwise desired for such granules to remain intact until molding. Upon molding the compositions in a heated mold, the water within the moldable mixture is able to at least partially gelatinize the starch granules, if desired, before being driven off as water vapor in order to solidify the molded article.

In one embodiment, the molding process includes positioning and locking the composition between a heated male mold having a desired shape and a heated female mold having a complementary shape. The heat from the molds causes the composition to expand within the molds. Water vapor and excess moldable composition are expelled from between the molds through vent holes. Once a sufficient amount of the water has been removed, the molds are opened, and the form-stable article having a foamed structural matrix is removed for subsequent processing. For example, the demolded articles may be coated with an appropriate coating, such as a biodegradable polymer (e.g., polylactic acid or other biodegradable polyesters), either applied as a liquid or as a laminating sheet or film.

Solid, unfoamed articles may also be manufactured by altering the molding conditions, usually by decreasing the amount of water in the starch-based composition, decreasing the volume of the mold cavity or space in which the mixture would otherwise expand, and evaporating the water more slowly.

III. Detailed Overview of Components

The moldable mixtures according to the invention will at a minimum include a thickening agent, water, and substantially uniformly dispersed fibers. Other admixtures may also be included within the moldable mixture, including but are not limited to, ungelatinized native starch granules, inorganic fillers, mold release agents, dispersants, integral coating and sealing materials, humectants, plasticizers, cross-linking agents, and the like.

A. Viscosity Increasing Agents/Thickening Agents.

The thickening agent, or viscosity and yield stress increasing agent, may be any organic material that is able to gelate in water and raise the yield stress and viscosity of the fluid fraction to the appropriate level. The thickening agent is preferably native starch that is initially ungelatinized but which is gelatinized in situ by raising the temperature to at least the gelation temperature of the particular native starch being used. The thickening agent may alternatively be pregelatinized starch or any of a myriad of other thickening agents known in the art, as set forth hereinbelow.

1. Starch-based Thickeners/Binders

The preferred viscosity and yield stress increasing agent is starch due to its relatively low cost, high biodegradability, and good binding strength upon heating a starch-based mixture within a heated mold cavity. Starch is a natural carbohydrate chain comprising polymerized sugar molecules (glucose). Plants manufacture and store starch as food for itself and for seeds. Starch is formed in granules that comprise two types of glucose polymers: the single-chain amylose that is generally soluble in water and other solvents and the branched amylopectin that is generally insoluble in water. In general, starch granules are insoluble in cold water. However, if the outer membrane has been broken by, e.g., grinding, the granules can swell in cold water to form a gel. In hot water, the granules quickly swell and then burst, resulting in gelation of the starch by the surrounding water. The exact temperature at which a starch granule swells and becomes gelatinized depends on the type of starch being used.

Gelatinization results from the binding of water molecules within the tangled mass of amylose and amylopectin chains through hydrogen bonding. Upon removal of the water by evaporation, the resulting mesh of inter-connected polymer chains forms a solid material that can have a tensile strength up to about 40–50 MPa. The gelated starch may also be referred to as a "starch-based binder" in light of its ability to bind together solid components, such as fibers or inorganic aggregate fillers, upon the evaporative removal of water.

Although starch is produced in many plants, the most important sources are seeds of cereal grains, such as corn, waxy corn, wheat, sorghum, rice, and waxy rice, tubers, such as potatoes, roots such as tapioca (i.e., cassava and manioc), sweet potato, and arrowroot, and the pith of the sago palm. If in a native state, such starches are known as "unmodified" starch. If gelated in water, they become "gelated" or "gelatinized" starch. If gelated and then dried to form a powder, they are "pregelated" or "pregelatinized" starch. If chemically altered by, e.g., etherification, esterification, oxidation, acid hydrolysis, amination, enzyme conversion, cross-linking, polymerization, etc., they are known as "modified" starches.

Typical modified starches include esters, such as the acetate and the half-esters of dicarboxylic acids/anhydrides, particularly the alkenylsuccinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

Since pregelatinized and many modified starches gelate in cold water, such starches can be added to the fibrous mixture to increase the viscosity and yield stress without heating. However, unmodified starches are generally preferred due to their lower cost and because they yield comparable articles.

One preferred starch is potato starch, which quickly gelates and reaches a maximum viscosity and yield stress at about 65° C., which then decrease somewhat as the mixture is heated further. Waxy corn starch acts in a similar fashion and is also preferred. Both potato starch and waxy corn starch yield a high viscosity, high yield stress fluid fraction when gelated. They are also preferred because they swell and gelate easily in a single step and are high in amylopectin. However, any starch that has similar swelling characteristics will be preferred to those that swell in two or more stages. Nevertheless, it will be appreciated that any starch may be used within the scope of the invention as a thickening agent. While any starch can be used to form moldable mixtures within the scope of the invention, the starch thickening agent will preferably be an unmodified starch having an amylose content less than about 45%, more preferably less than about 35%, and most preferably less than about 25%.

In order to create a fluid fraction within the fibrous mixture having the desired yield stress and viscosity, the gelatinized starch will preferably have a concentration in a range from about 5% to about 70% by weight of the fluid fraction, more preferably in a range from about 8% to about 50% by weight of the fluid fraction, and most preferably in a range from about 10% to about 30% by weight of the fluid fraction.

2. Other Thickening Agents

Thickening agents other than gelatinized starch can be added to form the appropriate fluid fraction within the fibrous mixture to effect fiber dispersion. In some cases, it may be desirable to add the other thickening agent in combination with a gelatinized starch-based thickening agent in order to assist in raising the yield stress and viscosity to the desired levels.

A variety of natural and synthetic organic thickening agents may be used which have a wide range of properties, including yield stress, viscosity, and solubility in water. A particularly suitable thickening agent that can be used in conjunction with, or even in place of, a starch thickening agent includes cellulose-based materials, which are chemically similar to starches in that they comprise polymerized glucose molecules. Cellulose-based thickening agents comprise a wide variety of cellulosic ethers, such as methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, and the like. The entire range of possible permutations is enormous and shall not be listed here, but other cellulosic materials which have the same or similar properties would also work well.

Other natural polysaccharide-based thickening agents include, for example, alginic acid, phycocolloids, agar, gum arabic, guar gum, locust bean gum, gum karaya, xanthan gum, and gum tragacanth. Suitable protein-based thickening agents include, for example, Zein® (a prolamine derived from corn), collagen (derivatives extracted from animal connective tissue such as gelatin and glue), and casein (derived from cow's milk).

Suitable synthetic organic thickening agents include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex (which is a broad category that includes a variety of polymerizable substances formed in a water emulsion; an example is styrene-butadiene copolymer).

Because of the wide variety of thickening agents that may be employed to assist, or perhaps even take the place of, the starch-based thickener, preferred concentration ranges shall not be given here. As a general rule, however, the preferred amount of thickening agent (or thickening agent plus starch-based thickener) within the fibrous mixture will be similar to the preferred concentration ranges for the starch-based thickener standing alone. Upon the removal of water from the starch-based composition, many of the other thickeners can also impart moderate to substantial binding within the structural matrix of the final hardened article.

B. Aqueous Solvent System.

The aqueous solvent system is an important component of the fluid fraction used to uniformly disperse the fibers and includes primarily water, but may optionally include co-solvents, dispersants, and other soluble admixtures to regulate the properties of the fluid fraction or overall starch-based composition. Principally, the water acts as a gelling agent for the starch-based thickening agent/binder or other thickening agents that may be included within the fluid fraction. The water and other co-solvents also act as a plasticizing agent to control the rheology of the fibrous composition. In general, the aqueous solvent system is removable by evaporation in order to form a substantially hardened or solidified starch-bound composition. In addition, non-evaporative liquids, such as lubricants, softening agents, plasticizers, cross-linking agents, integral coatings, or internal sealing materials may also be added.

In a preferred method for molding the articles of the present invention, the water and other volatile solvents within the fluid fraction are substantially removed by heating the starch-based composition within a heated mold cavity to above the boiling point of water. Because water has a relatively high heat of vaporization compared to most other volatile solvents, the heat of vaporization of the aqueous phase within the starch-based composition can be reduced by adding lower boiling alcohols or other co-solvents to the water. Alcohols, such as ethanol and isopropyl alcohol, are advantageous because they form lower boiling point azeotropic mixtures with water, are relatively inexpensive, and readily available.

The amount of water and other admixtures within the aqueous solvent system are adjusted to yield a fluid fraction and overall mixture having the desired yield stress and viscosity. During the dispersion process, the amount of water and other admixtures are adjusted so that the yield stress of the fluid fraction results in homogeneous dispersion of fibers within the fluid fraction. Once the fibers have been uniformly dispersed, however, the amount of water and other admixtures may be altered in order to obtain a composition having the desired rheology for its intended use, typically molding between heated dies or other heated mold cavity.

The rheology of the final mixture should be such that the solid components remain dispersed throughout the fluid fraction and do not settle or become agglomerated. Very low viscosity mixtures can result in settling of the components, most notably the solid components such as any native starch granules, the fibers, and inorganic filler particles.

C. Fibers

As used in the specification and the appended claims, the terms "fibers" and "fibrous materials" generally include organic fibers, more preferably plant-derived fibers. In general, any fiber that will improve the strength, flexibility, toughness, or other desired property of the molded composition can be used in the compositions of the present invention. Although fibers of any strength and aspect ratio can be dispersed using the compositions and methods disclosed herein, the present invention overcomes the problem of obtaining uniform dispersion of longer fibers (>2 mm). Hence, to the extent that fiber length is important, longer fibers may be said to be "preferred". In addition, because fibers of high aspect ratio have typically been more difficult to disperse in the past, to the extent that aspect ratio is important, fibers of high aspect ratio (>25:1) may be said to be "preferred". Fibers having an average length in a range of greater than about 0.3 mm, and which have an aspect ration of at least about 25:1 are within the scope of the invention.

The fibers that are used in connection with the inventive processes disclosed herein are preferably "dry-comminuted fibers". This term refers to fibers which, while in a substantially dry state and prior to blending into the fluid fraction, have been previously processed so as to be substantially separated and non intertwined with each other. An example of such fibers are "flash dried" fibers. Another example are fibrous sheets or rolls which have been chopped or torn apart into small fragments (e.g. <2 cm across). An example of "flash dried" fibers that are useful within the scope of the invention are prepared using a SWENSON Flash Dryer.

When using a SWENSON Flash Dryer, the fibers are dried in a hot gas stream which pneumatically conveys the material through the body of the dryer. In a flash dryer, the fibers are in intimate contact with the gas stream for only a very short time. The flash dryer is, therefore, ideally suited for removing free moisture from the surface of the fibers being dried. Operation of the flash dryer (not shown) is straightforward. A single exhaust fan, located on the clean gas side of the dust collector, is used to induce the flow of gas through the heater uptake pipe, horizontal duct, and dust collector separator. On occasion, a cage mill fan is used as a lump breaker to disintegrate any large agglomerates of fibers. Due to the design and operating techniques employed, the flash dryer can be easily adapted for closed-cycle operations. SWENSON flash dryers are available in carbon steel, stainless steel, and other alloys.

Useful fibers that can be dispersed within starch-based compositions according to the present invention include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits, or inorganic fibers made from glass, graphite, silica, ceramic, or metals. Even recycled paper fibers can be used.

The compositions and methods allow for the homogeneous dispersion of fibers having an average length up to about 25 mm and more, although at some point the benefit imparted by lengthier fibers might be outweighed by the difficulty of obtaining good dispersion of such fibers. Similarly, fibers having an average aspect ratio up to about 2500:1 or more can be dispersed using the inventive compositions and methods, although at some point further increase in the aspect ratio might be inefficient.

Adding uniformly dispersed fibers to starch-based compositions has been shown to impart a number of interrelated benefits, including greatly improved strength and toughness of a newly molded article so that it may be demolded and handled immediately thereafter. In addition, uniformly dispersed fibers greatly increase the flexibility of a hardened starch-bound article. The fibers allow for the demolding of hardened articles having virtually no water without the need for immediate conditioning before the article can be handled. As a result, such articles can simply be allowed to "self-condition" under ambient conditions.

The fibers also allow a greater window of time in which the article may be demolded without causing damaging effects, such as cracking of the material. Even if all of the water is taken out of the mixture by overheating, the fibers will prevent cracking of the formed structural matrix because they reinforce the entire matrix and prevent the article from shrinking. The moldable mixture can also be somewhat under heated without damage to the product. Under heating leaves more vaporized free water within the molded composition, which would normally lead to expansion and rupture of the structural matrix but for the internal strengthening effect provided by the fibers. Thus, fibers can also aid in retaining an appropriate amount of water within the article so that the article has increased toughness and flexibility. This, in turn, allows the product to be handled straight out of the mold with little or no damage.

The variation of water that may be left within the hardened starch-bound composition as a result of the uniformly dispersed fibers also facilitates the manufacture of starch-based articles having greatly varying cross-section or wall thickness. In the past, such articles were difficult to mold because of the inability to obtain form stability of the thicker portions where it takes longer to remove the water, while not over drying, cracking or burning the thinner portions where the water is removed much more quickly. However, the inclusion of uniformly dispersed fibers allows for the inclusion of varying amounts of water within the various sections of the molded article while maintaining fairly uniform strength throughout the article. Moreover, the extra water within the thicker portion will equilibrate into the drier thin portion within a relatively short period of time after the article is demolded (i.e., about one hour or less).

In addition, the fibers allow for large variations in the amount of water that can be added initially in order to change the density of the final product, whereas pure starch materials do not have this ability. Because the aqueous solvent can act as a foaming agent, the more water that is added to the starch-based composition initially, the larger the volume of the pores that will be created upon removing the water by evaporation. If less water is used, the lower the volume of the pores that will be created and the final product will be more dense. Thus, the density of the final product can be changed just by varying the amount of aqueous solvent within the starch-based composition. The fibers increase the working range of the water in the moldable mixture because they greatly increase the form stability and resistance to internal pressure.

The amount of fibers added to the moldable mixture will vary, depending upon the desired properties of the final product. The desired flexural strength, toughness, flexibility, and cost parameters are the principle criteria for determining the amount of fiber to be added in any mix design. The concentration of fibers can range anywhere from as low as about 1% to as high as about 80% by weight of the moldable composition, typically in a range from about 1% to about 40% by weight of total solids in the composition.

It is known that certain fibers are able to chemically interact with and bind with certain starches, thereby adding another dimension to the materials of the present invention. For example, it is known that many fibers are anionic in nature and have a negative charge. Therefore, in order to maximize the interaction between the starch-based binder and the anionic fibers and inorganic materials, it may be advantageous to add a positively charged organic binder, such as a cationic starch.

In addition, the fibers may be coated with a variety of substances in order to improve the desired properties of the final product. For example, the fibers may be coated in order to make them more resistant to water absorption. Better water resistance can be obtained by treating the fibers with rosin and alum ($Al_2(SO_4)_3$) or $NaAl(SO_4)_2$, the latter of which precipitates out the rosin onto the fiber surface, making it highly hydrophobic. The aluminum floc that is formed by the alum creates an anionic adsorption site on the fiber surface for a positively charged organic binder, such as a cationic starch. In addition, ettringite can be formed on the surface of the fibers in order to improve the interaction or interface between the fibers and a hydraulically settable binder. Finally, fibers having latex precipitated onto the surface give a more flexible interface between the fibers and the hardened matrix.

D. Optional Admixtures.

Although the present invention is mainly involved with compositions and methods for obtaining substantially uniform dispersion of fibers within starch-based compositions, the strengthening effect and versatility that is added to starch-based compositions might be better illustrated by identifying other admixtures that might be added to the starch-based compositions. In some cases, such as the addition of inorganic fillers, the uniformly dispersed fibers greatly increases the amount of loading of such fillers while maintaining the strength of the hardened articles formed thereby. This underscores the utility of adding homogeneously dispersed fibers according to the present invention.

1. Natural Mineral and Other Fillers

In many cases certain desired properties of the molded starch-bound composition may be improved by the addition of natural mineral fillers. The terms "aggregate" and "fillers", as used in the specification and the appended claims, typically refer to natural or treated mineral fillers. The difference between a filler and a fiber is often related to the aspect ratio of the substance in question. If the aspect ratio of a "fiber" is less than about 5:1, then the "fiber" is akin to a rectangular aggregate and might be better classified as a filler or aggregate instead. Moreover, agglomerated fibers or natural fibrous particles might also be better classified as fillers, since they are not anchored over a large distance relative to their width.

The term "inert organic particles" is further defined to include organic components that are not intended to primarily chemically or mechanically act as a binding agent within the starch-based composition. Examples of inert organic particles include seeds, grains, cork, and plastic spheres. Although most aggregates within the scope of the present invention are insoluble in water, some aggregates are slightly soluble in water, and some aggregates can be formed in situ by precipitation or polymerization. Many seeds contain starch, proteins, or other polymeric materials in high enough quantities that they may be released into the moldable mixture and impart a binding force within the mixture.

Although inorganic fillers are generally optional, articles with a high filler or aggregate content are generally cheaper to produce, have increased compressive strength, are more stable when microwaved, have lower specific heat, and have a smaller environmental impact. Studies have found that functional articles of the present invention can be made using no fillers at all or up to about 90% by weight of the final article. From a materials cost standpoint, it is more economical to replace the relatively expensive starch-based or other organic binder with a less expensive aggregate. Adding an inorganic filler also improves the ability to remove water from the moldable mixture in order to obtain a solidified molded article.

Fillers can also be added to yield articles having a desired surface finish. For example, plate-like aggregates having flat surfaces, such as mica, talc, and kaolin, can be used in order to create articles having a smoother surface finish. Typically, larger aggregates such as calcium carbonate give a matte surface, while smaller particles give a glassy surface.

Particle packing is a preferred process that can be used to maximize the amount of inorganics where a large percentage are included within the composition. Particle packing is the process of selecting different sizes, shapes, and concentration of the aggregates to minimize the interstitial space between the particles and maximize the packing density. By minimizing the interstitial space, less water and starch-based binder is required to fill up the interstitial space and, hence, the overall composition. Decreasing the specific surface area of the aggregates also decreases the amount of starch-based binder and water that must be included to adequately mold and then bind the components of the mixture.

Examples of useful aggregates or fillers include those that are commonly used in the paper industry, as well as more finely ground aggregate materials used in the concrete industry. However, the size of the aggregate or inorganic filler particles will generally be many times greater than the particles of the inorganic filler materials typically used in the paper industry, thereby greatly reducing their cost.

Examples of useful aggregates include perlite, vermiculite, sand, gravel, rock, limestone, sandstone, glass beads, aerogel, xerogels, seagel, mica, clay, synthetic clay, alumina, silica, fly ash, fused silica, tabular alumina, kaolin, microspheres, hollow glass spheres, glass beads, porous ceramic spheres, gypsum (dihydrate or hemihydrate), tabular alumina, calcium carbonate, calcium aluminate, perlite, vermiculite, lightweight polymers, xonotlite (a crystalline calcium silicate gel), pumice, exfoliated rock, lightweight expanded clays, sand, gravel, rock, limestone, sandstone, and other geologic materials, hydrated or unhydrated hydraulic cement particles, cork, seeds, and the like Another class of aggregates that may be added to the inorganically filled mixture includes gels and microgels, such as silica gel, calcium silicate gel, aluminum silicate gel, and the like. These can be added in solid form, as any ordinary aggregate material might, or they may be precipitated in situ. Because they tend to absorb waters, they can be added to reduce the water content (which will increase the viscosity and yield stress) of the moldable mixture.

The inorganic aggregates may be included in an amount in a range from about 0% to about 90% by weight of the total solids within the starch-based composition, with the preferred amount depending on the desired properties of the moldable mixture or final molded article.

2. Mold Release Agents

To assist in demolding the newly formed articles, a "mold release agent" can be added to the starch-based composition, such as medium- and long-chain fatty acids, their salts, and their acid derivatives. Preferred mold-releasing agents for use in the present invention include stearates, which have hydrophobic properties. Stearates are salts of stearic acid and have the general formula of $CH_3(CH_2)_{16}COO^-X+$, where X+ can be an ion of Al, Mg, Na, K, or Ca. Stearates have specific melting points that vary depending on what salt is used. Magnesium stearate is one preferred mold release agent that has been approved by the FDA. Another is aluminum stearate, which has a lower melting point of 110° C. and gives a smoother surface finish to a formed article. Generally, a lower melting point or increased amount of stearate will yield articles having a smoother surface.

Other mold release agents include silicones, lecithin (which is a mixture of phosphatides and glycerides), waxes (such as paraffin and beeswax), Teflon®-based materials, calcium silicate and CaS. Wax can also act as an integral coating material, as discussed later. The molds themselves can be polished, chrome plated, or coated with, e.g., nickel, Teflon®, or any other material that limits the tendency of the articles to stick to the molds.

The above-mentioned mold release agents are preferably added to the moldable mixture in a range from about 0.05% to about 15% by weight of the total solids, more preferably in a range from about 0.1% to about 10% by weight, and most preferably in a range from about 0.5% to about 1% by weight.

3. Dispersants

The term "dispersant", as used in the specification and the appended claims, refers to the class of materials which can be added to reduce the viscosity and yield stress of the moldable composition. Dispersants create a negative charge on or around the surfaces of the aggregate particles, thereby causing them to repel each other. This repulsion of the particles adds "lubrication" by reducing the friction or attractive forces that would otherwise cause the particles to have greater interaction. This decreases the amount of water that must be added to achieve a desired viscosity level of the mixture.

4. Other Admixtures

A variety of other components can be added to the moldable mixture to impart desired properties to the mixture and final article. For example, enzymes such as carbohydrase, amylase, and oxidase produce holes in the surface of starch granules, thereby permitting unmodified starch-based binders to gelatinize faster.

Humectants, such as $MgCl_2$, $CaCl_2$, NaCl, or calcium citrate, can be added to help retain water within the molded starch-based composition, which can improve toughness and flexibility. Flexibility can also be obtained by adding softeners or plasticizers to the moldable mixture, such as Polysorbate 60, SMG, mono and diglycerides, distilled monoglycerides, polyethylene glycol, glycerin, and sorbitol. Since the plasticizers do not vaporize during the forming process, they remain within the form-stable article, thereby softening the starch-bound matrix.

Integral coating materials that generally have a melting point above the boiling point of super heated water within the molded article, but below the maximum temperature achieved at or near the surface of the molded article while in the mold can be used. These include waxes, polylactic acid, shellac, or other polymers. In addition, internal sealing materials such as polyvinyl alcohol and latexes can be added to generally make the cellular matrix more water resistant. Finally, cross-linking admixtures such as dialdehydes, methylureas, and melamine formaldehyde resins can be added to the mixture to produce a less water soluble starch-based binder.

IV. Methods and Apparatus for Dispersing Fibers

The preferred method for uniformly dispersing fibers throughout the moldable composition may involve any number of different procedures and processing sequences so long as it employs a high yield stress, high viscosity fluid fraction to transfer shear from the mechanical mixing apparatus down to the fiber level. This may be achieved, for example, by gelatinizing starch or a starch derivative in an aqueous solvent, either alone or in combination with another thickening agent. The fibers and other solid components may be added at any time, before, during or after the interaction of the thickening agent and water to form the high yield stress, high viscosity fluid fraction. The only limitation is that the fluid fraction have the appropriate rheology during the fiber dispersion process. Once the fibers have been dispersed within the moldable composition to the desired level, the rheology of the fluid fraction becomes less important.

In a preferred method for dispersing fibers, fibers that are already substantially comminuted are added to a mixture of water, a thickening agent, and any optional admixtures in an appropriate mixing vessel and mixed in a single step to yield a moldable composition having uniformly dispersed fibers. If a pregelatinized or unmodified starch thickening agent is used, gelation and, hence, interaction between the thickening agent and water, occurs as the thickening agent is mixed into the aqueous phase of the fibrous slurry. If an unmodified starch is used, it will be generally necessary to raise the temperature of the fibrous slurry to above the gelation temperature of the particular unmodified starch being employed (usually in a range from about 60° C. to about 100° C.). This may be performed before, during or after the addition of the unmodified starch so long as it results in gelation of the starch-based thickening agent. In addition to, or in place of, the starch-based thickening agent, any of the aforementioned thickeners, or any equivalent thereto, may be used.

As the yield stress and viscosity of the fluid fraction are raised to the appropriate levels, the fibers are then dispersed by simply mixing the resulting thickened starch-based composition. Because of the generally thicker rheology of the fluid fraction, more force must be exerted on the mixing apparatus to simply maintain the same mixing speed, and thus more energy is imparted to the composition. However, it is not necessary to employ what has traditionally been referred to as "high shear mixing" in light of the greatly enhanced ability of the thickened fluid fraction to pull apart and disperse the fibers. For example, relatively low shear kneader-mixers may be employed, so long as the energy transferred from the mixer through the fluid fraction down to the fiber level is great enough to obtain the desired level of fiber dispersion.

In an alternative embodiment, the water and thickening agent are first interacted together separately to form the thickened fluid fraction, after which the fibers are added, either alone or in combination with any other solid component. The resulting mixture is appropriately mixed to obtain the desired level of fiber dispersion. If the thickened fluid fraction was formed by heating an unmodified starch, it will generally be preferable to cool the mixture before adding any additional unmodified starch that is intended to gelate only upon molding the starch-based composition using, e.g., heated dies.

The fibrous compositions according to the present invention can be prepared in either batch cycles or on a continuous basis. Suitable mixing apparatus that may be used to prepare batches of a desired fiber-filled composition include, but are not limited to, the following mixers: Eirich, Hobart, Hochmeyer and Marion. Suitable mixing apparatus that may be used to prepare a desired fibrous composition on a continuous basis include, but are not limited to, the following mixers: Teledyne and Oakes. Auger extruders, particularly twin auger extruders, are useful in continuously mixing and forming compositions within the scope of the invention. Nevertheless, any mixing apparatus known to those of ordinary skill in the art that would adequately disperse fibers throughout a thickened fluid fraction using the compositions and methods of the present invention are within the scope of the present invention.

Depending on the mixing apparatus, the yield stress and viscosity of the fluid fraction, and the concentration of fibers being dispersed, the time required to substantially disperse the fibers throughout the starch-based composition can vary. In general, however, the shortest mixing time that will provide adequate mixing is about 30 seconds, with about 1–5 minutes being the typical mixing time, and less than about 10 minutes being the more preferred mixing time, and less than about 5 minutes being most preferred.

V. Examples of the Preferred Embodiments

In order to generally teach compositions and processes for dispersing fibers within starch-based compositions, as well as processes for molding such compositions into a variety of molded articles of manufacture, each and every example set forth in U.S. Pat. No. 5,618,341 are incorporated herein by specific reference. Such examples clearly teach the general concept that including substantially homogeneously dispersed fibers greatly improves the mechanical properties of the molded articles. They also teach the importance of including a sufficient quantity of an appropriate thickening agent in order to transfer the shearing forces from the mixing apparatus down to the fiber level in order to effect fiber separation and dispersion.

In order to more particularly teach exemplary processes for dispersing fibers within starch-based as well as other moldable compositions in a substantially reduced amount of time compared to the times required to disperse the fibers in U.S. Pat. No. 5,618,341, the following examples are given. It should be understood that the following examples are only given by way of illustration. It is certainly within the ability of one or ordinary skill in the art, based on the disclosure herein, to modify any of such examples, such as by using different fibers, different concentrations of fibers, different thickening agents, or different additional components, all of which are clearly disclosed elsewhere in the disclosure or are at least suggested therein.

EXAMPLE 1

A simplified mixing process was used in order to obtain a composition having substantially uniformly dispersed fibers. The fibers that were used were flash dried fibers. The following components were used to form the fibrous mixture of Example 1.

| | |
|---|---:|
| Flash Dried Fibers | 327 g |
| Water | 4589 g |
| Pregelatinized Starch Powder (Paselli PGF) | 450 g |
| Native Potato Starch Granules (Avebe) | 1599 g |
| Calcium Carbonate (GSP 30) | 1101 g |
| Magnesium Stearate (FACI Vegetable) | 126 g |

First, all the powdered components were pre-blended in the bowl of a Hobart mixer. These included the calcium carbonate, the pregelatinized starch powder, the native potato starch granules, and the magnesium stearate. Thereafter approximately ¾ of the water and all of the flash dried fibers were added to the Hobart mixer bowl, and the resulting mixture was mixed for 4 minutes. The remaining water was added while continuing to mix for an additional 2 minutes.

The foregoing example demonstrated that using flash dried fibers instead of conventional fiber rolls allowed for complete homogeneous dispersion of fibers in 6 minutes. Articles molded therefrom had similar strength properties as articles molded from similar compositions disclosed in U.S. Pat. No. 5,618,341. However, reducing the mixing time greatly simplified and speeded up the overall manufacturing process. In addition, it greatly reduced the risk of mixture spoilage and premature gelatinization of the native potato starch granules.

EXAMPLE 2

Example 1 was repeated in every respect, except that ungelatinized Avebe wheat starch was substitute for the potato starch. In all other respects the results were substantially the same.

From the results of Examples 1 and 2, it became apparent that it might be possible to simply add all the ingredients at the same time and still obtain homogeneously mixed fibers in a short period of time so long as flash dried fibers are used.

EXAMPLE 3

The purpose of this example was to verify that a one step mixing process for a mix containing substantially homogeneously dispersed fibers was possible using flash dried fibers. The following components were used to form the fibrous mixture of Example 3.

| | |
|---|---:|
| Flash Dried Fibers | 324 g |
| Water | 4552 g |
| Pregelatinized Starch Powder (Paselli PGF) | 330 g |
| Native Potato Starch Granules (Avebe) | 1719 g |
| Calcium Carbonate (GSP 30) | 1101 g |
| Magnesium Stearate (FACI Vegetable) | 126 g |

All the components of the mix, including the pregelatinized starch powder, native potato starch granules, calcium carbonate, magnesium stearate, flash dried fibers and water, were weighed out and placed into a Hobart mixer bowl. Mixing was started at slow speed until dust generation subsided and was brought under control. Mixing then continued at high speed.

Mix samples were taken after 3 minutes and 6 minutes of mixing, respectively, and molded into school lunch trays. A cursory examination revealed occasional fiber lumps in the trays made from the sample mixed for 3 minutes, but no lumps were observed in the trays made from the sample mixed for 6 minutes. The foregoing example confirms that the use of flash dried fibers allows for the production of moldable mixtures having substantially homogeneously dispersed fibers in approximately 6 minutes in a single-step mixing process. Fairly well mixed compositions with only occasional fibrous lumps were even obtained in 3 minutes, thus indicating that mixing times of less than 6 minutes and greater than 3 minutes might be feasible.

EXAMPLES 4–6

Examples 1–3 were repeated in every respect, except that a fibrous sheet that had been chopped into small pieces (<2 cm across) was substituted for the flash dried fibers. The mixing time required to disperse such fibers was slightly greater due to the need for the mixing apparatus to first separate the fibers from the individual pieces prior to their being substantially homogeneously dispersed throughout the fibrous mixture. The mixing time was about 8 minutes.

VI. Summary

From the foregoing, the present invention provides compositions and methods for dispersing plant-based fibers in significantly shorter periods of time.

The invention further provides compositions and methods for dispersing plant-based fibers in a significantly shorter period of time and which can be performed in a single step.

The invention additionally provides compositions and methods for dispersing plant-based fibers while imparting less overall shear to the composition, thus reducing the mechanical stresses and potential damage experienced by the fibers and other solid components that may be added to the composition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for dispersing fibers within a fibrous composition comprising:
   (a) providing plant-derived fibers having an average length greater than about 0.3 mm, an average aspect ratio greater than about 25:1, and that comprise at least one of (i) fibers that are substantially separated and non-intertwined, (ii) dry fibrous sheets that have been separated into fragments smaller than 2 cm across, (iii) dry fibrous rolls that have been separated into fragments smaller than 2 cm across, and (iv) mixtures of the foregoing;
   (b) combining the plant-derived fibers, water and a thickening agent to form a fibrous composition and such that the thickening agent and water interact together to form a fluid fraction that is characterized by a yield stress and viscosity that enables the plant-derived fibers to be substantially uniformly dispersed throughout the fibrous composition as the fibers and fluid fraction are mixed together; and
   (c) mixing together the combined thickening agent, water, and fibers in order to substantially uniformly disperse the fibers throughout the fibrous composition.

2. A method as defined in claim 1, wherein the thickening agent comprises at least one of unmodified starch that is gelatinized in situ, pregelatinized starch or modified starch.

3. A method as defined in claim 1, wherein the thickening agent is included in an amount in a range from about 5% to about 70% by weight of the fluid fraction.

4. A method as defined in claim 1, wherein the thickening agent is included in an amount in a range from about 8% to about 50% by weight of the fluid fraction.

5. A method as defined in claim 1, wherein the thickening agent is included in an amount in a range from about 10% to about 30% by weight of the fluid fraction.

6. A method as defined in claim 1, wherein step (b) further includes adding at least one additional component comprising at least one of an inorganic filler, ungelatinized starch granules, a mold release agent, a dispersant, an enzyme, a plasticizer, a humectant, an internal coating material, an organic filler, a cross-linking agent, an integral sealing material, and inorganic fibers made from at least one of glass, graphite, silica, ceramic, or metals.

7. A method as defined in claim 6, wherein all of the components are combined and mixed in a single step.

8. A method as defined in claim 1, wherein the yield stress of the fluid fraction is greater than about 100 Pa.

9. A method as defined in claim 1, wherein the apparent viscosity of the fluid fraction measured at a shear rate of 5 $s^{-1}$ is in a range from about 30 Pa·s to about 200 Pa·s.

10. A method as defined in claim 1, wherein step (c) has a duration of less than about 15 minutes.

11. A method as defined in claim 1, wherein step (c) has a duration of less than about 10 minutes.

12. A method as defined in claim 1, wherein step (c) has a duration of less than about 5 minutes.

13. A method as defined in claim 1, wherein the water, thickening agent, and fibers are mixed using at least one of a kneader mixer, a high shear mixer, or a twin auger extruder.

14. A method as defined in claim 1, wherein the fibers have an average aspect ratio greater than about 100:1.

15. A method as defined in claim 1, wherein the fibers have an average aspect ratio greater than about 1000:1.

16. A method as defined in claim 1, wherein the fibers have an average length greater than about 2 mm.

17. A method as defined in claim 1, wherein the fibers have a concentration in a range from about 1% to about 40% by weight of the fibrous mixture.

18. A method as defined in claim 1, wherein the fibers have a concentration in a range from about 2% to about 80% by weight of solids in the fibrous mixture.

19. A method as defined in claim 1, wherein the thickening agent is at least one of a cellulosic ether, a protein, a polysaccharide gum, or a synthetic organic binder.

20. A method as defined in claim 1, wherein the fibrous composition is placed into a heated mold cavity in order to remove at least a portion of the water therefrom and yield a form stable composition having a desired shape.

21. A method as defined in claim 1, wherein the plant-derived fibers are prepared by a flash drying process.

22. A method for dispersing fibers within a fibrous composition comprising:
   (a) providing plant-derived fibers that are substantially separated and non-intertwined and that have an average length greater than about 0.3 mm and an average aspect ratio greater than about 25:1;

(b) combining the plant-derived fibers, water and a thickening agent to form a fibrous composition and in order for the thickening agent and water to interact together to form a fluid fraction characterized by a yield stress and viscosity so as to enable the plant-derived fibers to be substantially uniformly dispersed throughout the fibrous composition as the fibers and fluid fraction are mixed together, the fibers having an average length greater than about 0.3 mm and an average aspect ratio greater than about 25:1; and (c) mixing together the combined thickening agent, water, and fibers in order to substantially uniformly disperse the fibers throughout the fibrous composition.

23. A method as defined in claim 22, wherein the plant-derived fibers are prepared by a flash drying process.

24. A method for dispersing fibers within a fibrous composition comprising:

(a) providing plant-derived fibers having an average length greater than about 0.3 mm, an average aspect ratio greater than about 25:1, and that include at least one of (i) dry fibrous sheets that have been separated into fragments smaller than 2 cm across, (ii) dry fibrous rolls that have been separated into fragments smaller than 2 cm across, and (iii) mixtures of the foregoing;

(b) combining the plant-derived fibers, water and a thickening agent to form a fibrous composition and in order for the thickening agent and water to interact together to form a fluid fraction characterized by a yield stress and viscosity so as to enable the plant-derived fibers to be substantially uniformly dispersed throughout the fibrous composition as the fibers and fluid fraction are mixed together; and (c) mixing together the combined thickening agent, water, and fibers in order to substantially uniformly disperse the fibers throughout the fibrous composition.

* * * * *

UNITED STATES PATENT AND TRADEMARK OFFICE
CERTIFICATE OF CORRECTION

PATENT NO.    : 6,379,446 B1
DATED         : September 24, 2002
INVENTOR(S)   : Per Just Andersen and Simon K. Hodson It is certified that error appears in the above-identified patent and that said Letters Patent is hereby corrected as shown below:

<u>Title page,</u>
Item [57], ABSTRACT,
Line 8, after "The" change "dry-committed" to -- dry-comminuted --
Line 11, after "been" change "dry-committed" to -- dry-comminuted --

<u>Column 3,</u>
Line 33, after "appropriately" change "committed" to -- comminuted --

<u>Column 11,</u>
Line 44, after "aspect" change "ration" to -- ratio --

Signed and Sealed this

Eleventh Day of February, 2003

JAMES E. ROGAN
*Director of the United States Patent and Trademark Office*